(12) United States Patent
Deegan et al.

(10) Patent No.: US 9,654,809 B2
(45) Date of Patent: May 16, 2017

(54) METHOD AND SYSTEM FOR PROVIDING LIVE TELEVISION AND VIDEO-ON-DEMAND CONTENT TO SUBSCRIBERS

(75) Inventors: Niall Deegan, Dublin (IE); Michael Clinton, Clontarf (IE)

(73) Assignee: DMD Digital Media Distribution Limited, Clonshaugh, Dublin (IE)

( * ) Notice: Subject to any disclaimer, the term of this patent is extended or adjusted under 35 U.S.C. 154(b) by 0 days.

(21) Appl. No.: 14/234,881

(22) PCT Filed: Jul. 26, 2011

(86) PCT No.: PCT/IE2011/000041
§ 371 (c)(1),
(2), (4) Date: Jan. 24, 2014

(87) PCT Pub. No.: WO2013/014658
PCT Pub. Date: Jan. 31, 2013

(65) Prior Publication Data
US 2014/0157336 A1 Jun. 5, 2014

(51) Int. Cl.
*H04N 21/23* (2011.01)
*H04N 21/2743* (2011.01)
(Continued)

(52) U.S. Cl.
CPC ........... *H04N 21/23* (2013.01); *H04L 65/605* (2013.01); *H04L 67/02* (2013.01);
(Continued)

(58) Field of Classification Search
None
See application file for complete search history.

(56) References Cited

U.S. PATENT DOCUMENTS 6,529,146 B1 *   3/2003   Kowalski ................ H03M 7/00
                                                    341/50
6,873,877 B1     3/2005   Tobias et al.
(Continued)

OTHER PUBLICATIONS

International Search Report for International Application No. PCT/IE2011/000041 mailed Apr. 5, 2012.

*Primary Examiner* — Omar S Parra
(74) *Attorney, Agent, or Firm* — Brian J. Colandreo; Michael T. Abramson; Holland & Knight LLP

(57) ABSTRACT

This invention relates to a method and system for providing live television and video-on demand content to a plurality of content viewers' devices, the content viewers' devices having a plurality of disparate content viewing applications thereon. A content provider uploads content to a content server and the content server delivers that content in a streaming format upon request to the user devices. In order to upload the content, the content providers access a web page hosted by the content server with a plurality of encoders embedded into the web page. The content providers use the embedded encoders to convert the content into a plurality of streaming formats and upload the content to the content server in the streaming formats. This significantly speeds up the transfer of content to the content server, ensures that the content is made available to the user devices earlier, and obviates the need for additional expensive equipment at the content server.

17 Claims, 5 Drawing Sheets

(51) Int. Cl.
*H04N 21/4782* (2011.01)
*H04N 21/81* (2011.01)
*H04L 29/06* (2006.01)
*H04L 29/08* (2006.01)

(52) U.S. Cl.
CPC ..... *H04N 21/2743* (2013.01); *H04N 21/4782* (2013.01); *H04N 21/8173* (2013.01)

(56) References Cited

U.S. PATENT DOCUMENTS

| | | |
|---|---|---|
| 2002/0120939 A1 | 8/2002 | Wall et al. |
| 2007/0162487 A1* | 7/2007 | Frailey .......................... 707/102 |
| 2007/0174774 A1 | 7/2007 | Lerman et al. |
| 2009/0049122 A1 | 2/2009 | Wayne et al. |
| 2009/0204885 A1* | 8/2009 | Ellsworth et al. ............ 715/234 |

\* cited by examiner

METHOD AND SYSTEM FOR PROVIDING LIVE TELEVISION AND VIDEO-ON-DEMAND CONTENT TO SUBSCRIBERS

RELATED APPLICATIONS

The subject application is a U.S. National Stage application of International Application No. PCT/IE2011/000041 filed Jul. 26, 2011. The entire contents of the Application are herein incorporated by reference in its entirety.

INTRODUCTION

This invention relates to a method and system for providing Live TV and or video-on-demand content to a plurality of content viewers' devices, the content viewers' devices having a plurality of disparate content viewing applications thereon.

Throughout this specification, the terms content viewer's devices, user devices and variants thereof have been used interchangeably and will be understood to include mobile telephones and Internet enabled devices such as but not limited to personal computers, smartphones, smart TV devices, laptops, computing tablets such as iPads (Registered Trade Mark®) and the like.

As content viewer's devices have become more technologically advanced and their processing capability has increased, they are increasingly being used for viewing video-on-demand content. Typically, the video-on-demand content clip is sent from a content provider to a content server. The content server encodes the clip into a streaming format suitable for distribution to user devices and the content viewer's device thereafter downloads or streams the clip the clip in the viewing format to view on their user device. However, due to the large number of user device manufacturers and the variety of user device handsets, there are numerous different types of content viewing applications, not all of which are compatible with the streaming format provided by the content server.

In order to overcome this problem, the content server will usually encode the content clip into a plurality of different streaming formats that are suitable for a range of user devices. The content viewer's device users are then able to download the clip in the streaming format compatible with the content viewing application on their user device. In this way, the content will be accessible to a far wider audience. There are however several problems with the known methods and systems.

First of all, video-on-demand content clips are often relatively large in size, typically between 1 to 2 gigabytes (Gb) in size for a few minutes of regular viewing. The content clips can be even larger in formats such as high definition that are currently available. The content provider has to upload the clip from their computer to the content server. This upload can take a significant period of time, often in excess of 15 minutes to complete. Secondly, this lengthy transfer of the large content clip requires a significant amount of bandwidth to perform and is therefore usually expensive to do. Thirdly, a substantial amount of expensive equipment is required at the content server as the content server must store the original copy of each content clip received from the content provider as well as copies of the content clip in all of the encoded streaming formats.

Finally, in addition to the above, there is a further problem in that it often takes a significant length of time for a clip to be encoded and made available to content viewer's device users as backlogs often arise at the content server. It is not uncommon for a clip to take 24 hours before it is made available to the users. This is highly disadvantageous in many instances particularly those where the content clip is news or current affairs related. A significant delay can result in the content clip being rendered irrelevant or out-dated.

It is an object of the present invention to provide a method and system that overcome at least some of the above-mentioned problems.

STATEMENT OF INVENTION

According to the invention there is provided a method of providing Live TV or video-on-demand content available for distribution to a plurality of content viewers' devices, the content viewers' devices having a plurality of disparate content viewing applications thereon, in a system comprising:

a content provider computer operated by a content provider; and a content server accessible by the content provider computer over a data communications network and accessible by the content viewers' devices over one of the data communications network and a mobile telecommunications network, the content server having accessible memory, the method comprising the steps of:

storing content on the content provider computer;

the content provider computer accessing a webpage hosted by the content server, the web page having a plurality of content encoders embedded therein;

the content provider computer selecting the content for distribution and thereafter encoding the content into a plurality of streaming formats using the plurality of content encoders and uploading the content in the plurality of streaming formats to the content server;

storing the content in the plurality of streaming formats on the content server's accessible memory; and updating at least one of a web page and a wireless application protocol (WAP) page accessible by the content viewers' devices with a link to access the uploaded content.

By having such a method, all encoding of the content will be performed not on the content server but instead will be performed on the content provider computer. This will reduce the size of the files being transferred from the content provider computer significantly, often by a factor of 100 times or more, thereby reducing the time taken to transfer the files to the content server and reducing the bandwidth requirement. In addition to the above, the equipment requirement and cost at the content server will be significantly reduced as the large original content clip is no longer provided to the content server and the content server does not require expensive hardware encoders to encode the clips. Furthermore, the encoded content will be available to the user devices far quicker than was heretofore the case as the content clip will not have to wait to be encoded into several different streaming formats by the content server. Instead, the content will be made available to user devices in multiple streaming formats almost instantaneously. In addition to the above, the content provider will be able to keep the original content in-house and the original content will not be located remotely out of their control.

A significant advantage of the present invention results from the manner in which the plurality of encoders is embedded into a web page. By embedding the encoders into a web page, the content provider will not have to download various software applications for encoding the software onto their computer and the encoding is all done through the web page. The content will be encoded into a plurality of streaming formats and uploaded to the content server in a single unitary action and the content provider will not have to perform multiple encoding and uploading operations, one for each of the different streaming formats that it wishes to provide the content in, or indeed separate encoding and uploading actions for each streaming format. In this way, the process is highly automated. Furthermore, as specialised software is not required on the content provider computer, the content provider can upload content from any computer that has web access. This is seen as particularly beneficial as content providers will be able to upload content from any device capable of storing the content and accessing the web page.

In one embodiment of the invention there is provided a method comprising the preliminary step of providing a web page tailored specifically to the content provider with the plurality of encoders embedded therein pre-selected according to a content provider's specification. In this way, the content provider can determine which streaming formats it wishes to support and can choose a wide range of content viewing applications that its content can be viewed with.

In one embodiment of the invention there is provided a method in which the content server hosts a plurality of web pages each having a plurality of encoders embedded therein and the step of the content provider computer accessing a web page hosted by the content server further comprises the content provider computer accessing the web page tailored specifically for the content provider.

In one embodiment of the invention there is provided a method in which the web page comprises a plurality of web page components and the method comprises the initial step of embedding only one encoder in any given component. This is seen as a particularly beneficial aspect of the present invention. Generally speaking, it is not possible to place multiple encoders into a single web page and have each of those multiple encoders encode a particular content file in a single unitary operation as the multiple encoders will conflict and stall. Advantageously, by placing only one encoder into any given component, the encoders will not conflict with each other.

In one embodiment of the invention there is provided a method in which the web page comprises a web page component and the method comprises the initial step of programming a plurality of encoders in a sequential manner into a single component so that the encoders are called in a predetermined sequence. This is seen as a useful alternative to placing only a single encoder into a given component and reduces the number of components required.

In order to achieve this, the code could be provided with a sequence in one script. The script would make exact determinations on the process along with some "whatIf" type statements to check what is about to be done before doing it. This is similar to running a batch script, with a command saying if something isn't there, skip it. According to the present invention, a check is performed to see if a particular encoder is present, and then start that encoder first before starting the remaining encoders.

In one embodiment of the invention there is provided a method in which prior to encoding the content into a plurality of streaming formats, the method comprises the step of determining whether there is a Windows®-based encoder embedded in the web page and, if present, starting encoding with the Windows®-based encoder before encoding with the other encoders.

In one embodiment of the invention there is provided a method comprising the additional step of establishing a private secure network connection between the content provider computer and the content server. By establishing a private secure network connection through the internet, it will be possible to upload the encoded content in streaming format from the content provider to the content server in a fast, secure manner and the encoded content can be uploaded to the content server as the content is being encoded.

In one embodiment of the invention there is provided a method comprising the step of uploading the encoded content in streaming format immediately as it is encoded. This reduces the time taken to complete the encoding and uploading operation thereby further reducing the time required to upload content to the content server and make it available to the user devices.

In one embodiment of the invention there is provided a system for providing video-on-demand content to a plurality of content viewers' devices, the content viewers' devices having a plurality of disparate content viewing applications thereon, the system comprising:
  a content provider computer operated by a content provider, the content provider computer having a web browser;
  a content server accessible by the content provider computer over a data communications network and accessible by the content viewers' devices over one of the data communications network and a mobile telecommunications network;
  a web page hosted by the content server and accessible by the content provider computer, the web page having embedded therein a plurality of encoders for encoding content into a plurality of streaming formats and uploading the content in the plurality of streaming formats from a content provider computer to the content server;
  the content server having accessible memory for storage of the content in the plurality of streaming formats; and
  the content server hosting at least one of a web page and a WAP page accessible by the content viewers' devices with a link to access the uploaded content thereon.

This is seen as a particularly useful and efficient, yet simple, system to use to provide content in multiple streaming formats to user devices with a plurality of disparate content viewing applications. Such a system reduces the infrastructure cost significantly and furthermore will enable content to be made available to user devices faster than was heretofore the case.

In one embodiment of the invention there is provided a system in which the content server hosts a plurality of web pages each having a plurality of encoders embedded therein.

In one embodiment of the invention there is provided a system in which each web page is tailored specifically to one of the content providers with the plurality of encoders embedded therein pre-selected according to that content provider's specification.

In one embodiment of the invention there is provided a system in which the web page comprises a plurality of web page components, each component having only one encoder embedded therein.

In one embodiment of the invention there is provided a system in which the web page comprises a web page component and there is provided a plurality of encoders programmed in a sequential manner into the web page component.

In one embodiment of the invention there is provided a system comprising a private secure network connection between the content provider computer and the content server.

In one embodiment of the invention there is provided a system in which one of the content provider computer and the content server is located locally and the other of the content provider computer and the content server is located remotely.

DETAILED DESCRIPTION OF THE INVENTION

The invention will now be more clearly understood from the following description of some embodiments thereof given by way of example only with reference to the accompanying drawings, in which.

Figure 1:
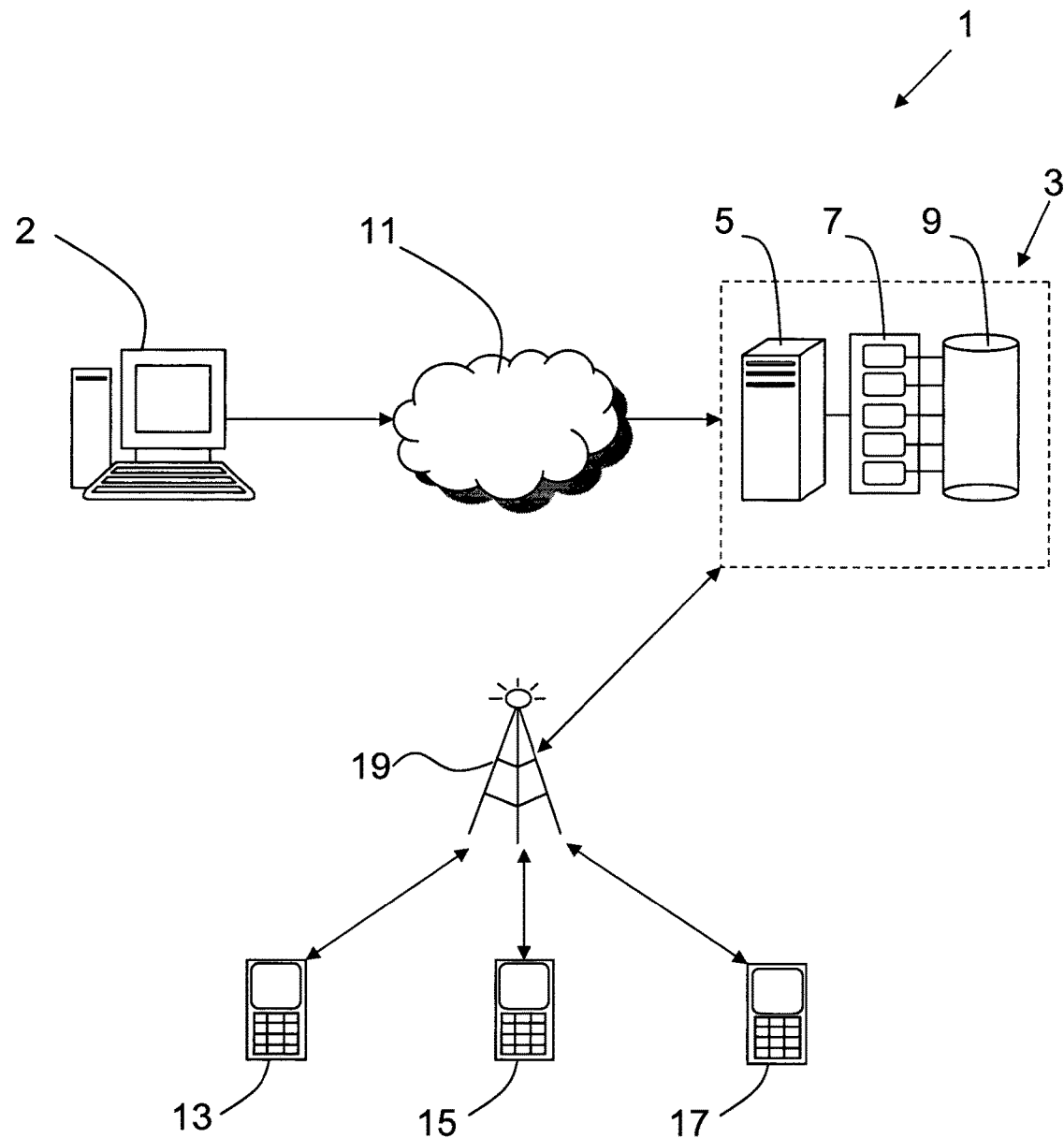
FIG. 1 is a diagrammatic representation of a system for providing video-on-demand content known in the art.

Referring to FIG. 1, there is shown a diagrammatic representation of a system for providing video on demand content already known in the art, indicated generally by the reference numeral 1. The system comprises a content provider computer 2 and a content server, indicated generally by the reference numeral 3. The content provider computer 2 communicates with the content server 3 over a data communications network, illustrated here by the internet 11. The content server 3 in turn further comprises a content server processor and temporary storage 5, an encoder bank 7 having a plurality of encoders and a memory 9. There is further shown a plurality of mobile telephones 13, 15, 17 in communication with the content server 3 over a mobile telecommunications network 19. For simplicity, only three mobile telephones have been shown however it will be understood that there may be several more user devices in communication with the content server.

In use, a content provider uploads content from their content provider computer 2 to the content server 3 over the internet 11. The content is a video clip and typically will be relatively large in size, of the order of 1 to 2 Gb. The time taken to upload the clip varies depending on the speed of the internet connection but it is not uncommon for the clip to take in the region of 15 minutes to upload with relatively good internet connection speed. Once uploaded, the content is stored in content server processor and temporary storage 5 until such time that the encoder bank 7 is in a position to receive the content. In some instances, due to the fact that the encoder bank will receive several content clips from that content provider and a plurality of other content providers (not shown), there will be a backlog and the content clip is not sent to the encoder bank 7 for an extended period of time, possibly for several hours.

When the encoder bank 7 is ready to receive the content, the content is passed through the plurality of encoders in the encoder bank 7, each of which converts the content into a different streaming format, and the streaming format versions of the content are stored in memory 9, ready for distribution to the mobile telephones 13, 15, 17. A link is inserted on a web and a WAP page accessible by the mobile telephones to allow access to the content. When one of the mobile telephones requests content from the content server 3, the content in the appropriate streaming format for that requesting mobile telephone's content viewing application is retrieved from memory 9 and transmitted to the mobile telephone over the mobile telecommunications network 19.

Figure 2:
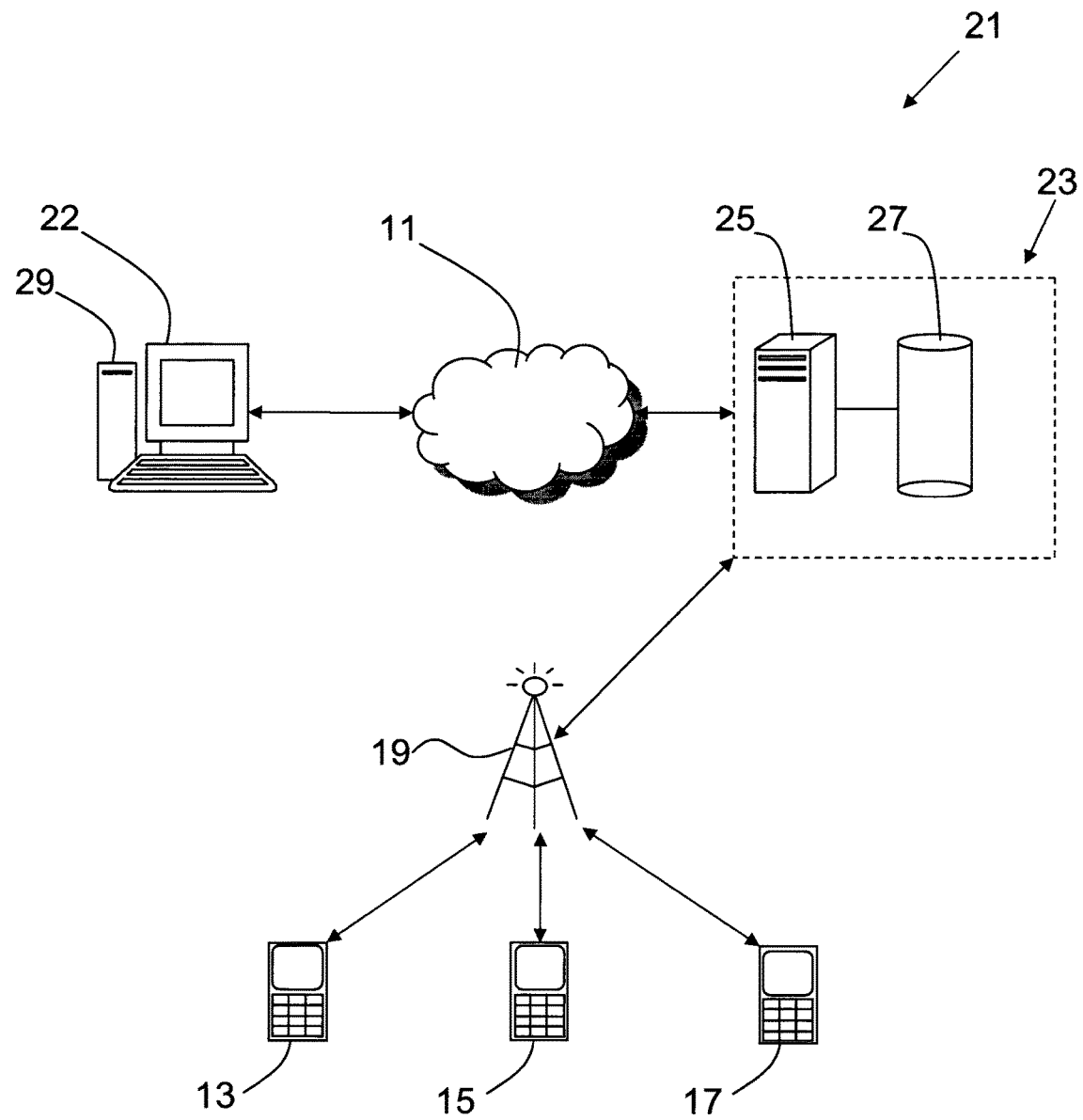
FIG. 2 is a diagrammatic representation of a system for providing video-on-demand content according to the invention.

Referring to FIG. 2 of the drawings, there is shown a diagrammatic representation of a system for providing video-on-demand content available for distribution to a plurality of content viewers' devices according to the invention, indicated generally by the reference numeral 21, where like parts have been given the same reference numeral as before. The system comprises a content provider computer 22 having accessible memory 29, in communication with a content server 23 over a data communications network 11. The content server 23 comprises a content server processor and web server 25 and an accessible memory 27. The content server processor and web server 25 hosts a web page (not shown) having a plurality of encoders embedded therein. There is further shown a plurality of user devices, in this case represented by mobile telephones 13, 15, 17 in communication with the content server 3 over a mobile telecommunications network 19. For simplicity, only three mobile telephones 13, 15, 17 have been shown however it will be understood that there will be many more mobile telephones, perhaps tens or hundreds of thousands of mobile telephones in communication with the content server. Indeed, it will be understood that many other types of user devices could be in communication with the content server 23 over the mobile telecommunications network 19 or the data communications network 11.

The content server 23 will also preferably include a WAP server (not shown) for servicing streaming format content requests from mobile telephone's and may include a second web server (not shown) for servicing streaming format content requests received over the internet 11 from other computing devices (not shown) such as, but not limited to, personal computers (PCs), laptops, tablets, iPads (Registered Trade Mark®), think pads, smart phones, iPhones® and the like computing devices that can communicate over the internet 11 as opposed to the mobile telecommunications network 19. Alternatively, the content server processor and web server 25 could handle communications with both the content providers and the other computing devices. Content server 23, will include a WAP server and in some cases a web server and in other cases an applications server. The content provider will be able to upload content via the internet or a telecoms network. The end user will also be able to view the latest content over the internet or over the telecommunications network.

In use, an operator of the content provider computer 22 accesses the web page with the plurality of encoders embedded therein hosted by the content server processor and web server 25. Preferably, this is done over a private secure network connection between the content provider computer 22 and the content server 23. Once the web page with the plurality of encoders embedded therein is rendered on the content provider computer 22, the operator of the content provider computer 22 selects a content clip stored in accessible memory 29 and inserts the details of the content clip into the web page. The web page thereafter retrieves the content clip from accessible memory 29 and provides the content clip to the encoders embedded in the web page.

The plurality of encoders embedded in the web page encode the content into a plurality of streaming formats and simultaneously upload the content in the plurality of streaming formats to the content server 23. The content server 23 stores the content in accessible memory 27 ready for distribution to the user devices, in this case the mobile telephones 13, 15, 17. A link is created by the content server processor and web server 25 and inserted on at least one of a web and a WAP page to allow access to the content by the plurality of user devices 13, 15, 17. When one of the user devices requests content from the content server 3, the content in the appropriate streaming format for that requesting user device's content viewing application is retrieved from memory 27 and transmitted to the mobile telephone over the mobile telecommunications network 19.

Technically speaking, the software is embedded in the page, similar to the manner in which a java script might be embedded into a page showing a real time clock. The software is an application in which the code is embedded into a page to make it easier to access without having to download multiple applications and learn how to use them.

The content is available practically instantaneously to the mobile telephones due to the fact that the content is already in a plurality of streaming formats prior to reaching the content server 23 and the content does not have to await encoding. Furthermore, the encoded content will be a fraction of the size of the original content clip, usually of the order of a few megabytes (Mb) in size, and is uploaded far quicker than with the prior art system. This speeds up the delivery of the content to the mobile telephones. Advantageously, a copy of the original content clip in un-encoded format does not have to be stored in the content server's accessible memory 27.

It is envisaged that there will be several content providers in communication with the content server, however for reasons of simplicity, only one of which has been shown in the present embodiment. Therefore, it is envisaged that there will be several web pages, each of which is specific to a given content provider. The content provider can access their web page and upload content in the streaming formats desired by them into a location desired by them also. Furthermore, it is envisaged that a content provider, per se, may in fact comprise a number of contributors operating on one or more content provider computers but are grouped together as a single content provider. For example, a content provider may be an institution such as The British Broadcasting Corporation (BBC)® television station and a plurality of the television station's personnel, for example their news reporters, would have access to the BBC's web page hosted by the content server 23 for encoding and uploading content. Any of the reporters, using any computer with a web browser and an Internet connection, could access the BBC's web page hosted by the content server 23 and encode and upload content in streaming formats to the content server 23.

It can be seen therefore from the foregoing that content can be uploaded from any of the reporters using their own browser on their content provider computer 22 and from the content in their content provider computer's memory 29. The content could come directly from a video camera (not shown) or the like that is connected to a network which in turn connects the video camera to the content provider computer 22 or the video camera could be connected directly to the content provider computer 22 via a cable or other link.

In the embodiment shown, the system and methods determine the type of user device that is being used. In this way, when a user logs in, the method and system according to the present invention recognize what device type of user device it is, such as a mobile telephone, PC or Smart TV and the appropriate content format is provided to them.

Figure 3:
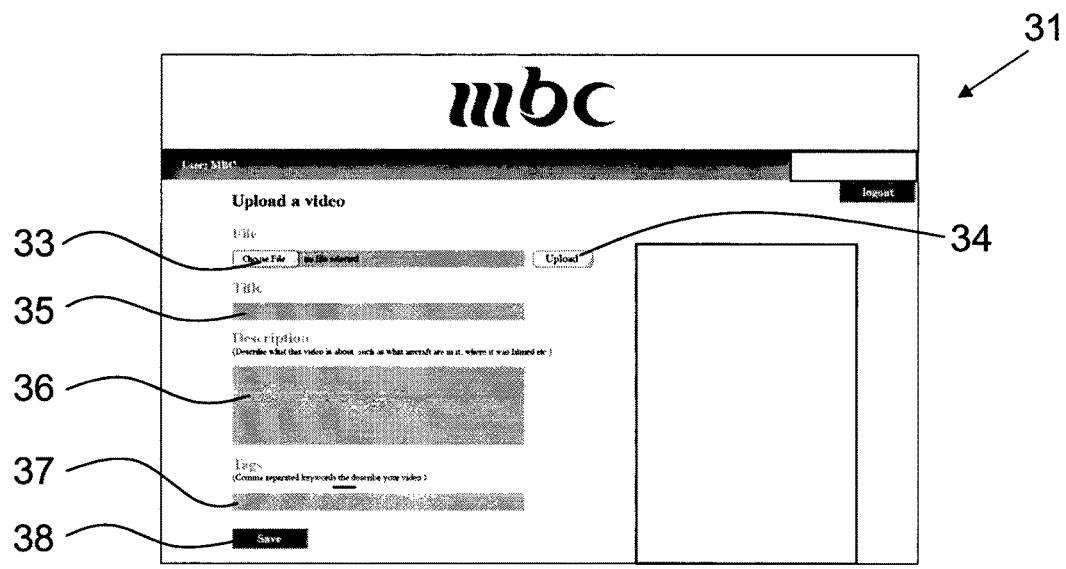
FIG. 3 is a screen shot of a web page used to implement the present invention.
Figure 4:
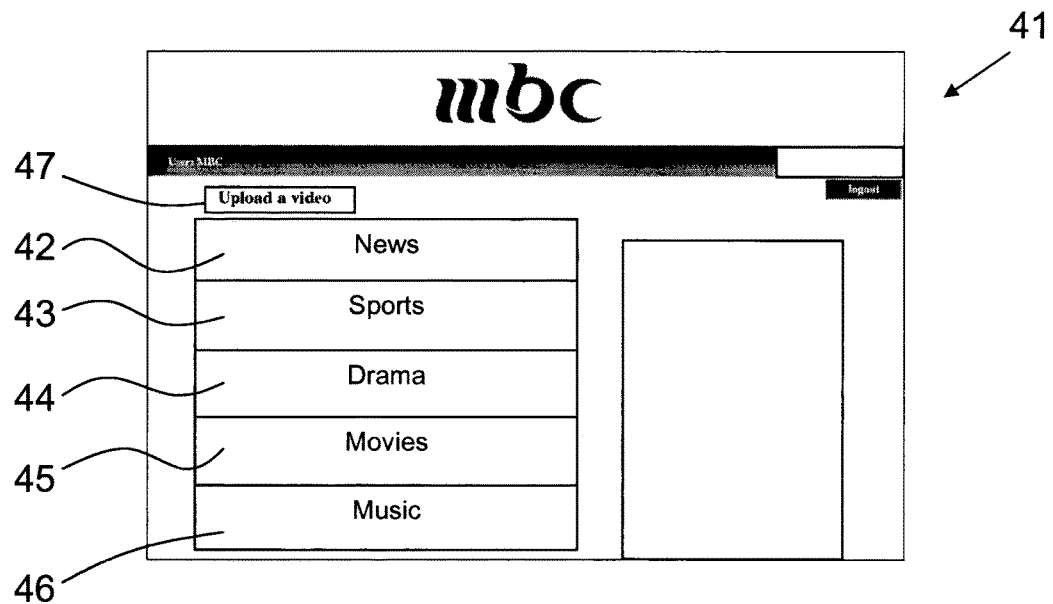
FIG. 4 is a screen shot of another web page used to implement the present invention.

Referring now to FIGS. 3 and 4, there are shown representations of the web page for use by the content provider and hosted by the content server. Referring specifically to FIG. 3, after the content provider has logged in to the web page, preferably using a username and a robust password, the web page 31 shown in FIG. 3 will be rendered on their content provider computer 22 screen. The web page 31 comprises a File field 33, an Upload button 34, a Title field 35, a Description field 36, a Tags field 37 and a Save button 38. It is envisaged that additional functionality will be added to this page such as value, duration, additional copyright, location for use, genre, age limit and the like.

The File field 33 allows the content provider computer to select a file stored on the hard drive or on a memory device connected to the computer. The user can type in the file name and location or can search using commonly known search tools used to search for a file in a computer system. Once selected, the user inserts a title of the content in the Title field 35, a description of the content in the Description field 36 and several tags for the content in the Tags field 37. Tags are identifier words used to assist in searching for content and are well understood in the art. If the user wishes to encode and upload the content, they select or click on the Upload button 34 in the known manner, for example by using a pointing device such as a mouse and clicking the mouse button when a mouse cursor is over the Upload button 34. This causes the screen to be updated to the screen shown in FIG. 4. Alternatively, the user can click on the Save button 38 and the session will be saved in memory on either the content provider computer's accessible memory 29 or as a session on the content servers accessible memory 27.

Referring specifically to FIG. 4, there is shown a web page, indicated by the reference numeral 41. The web page has a number of fields 42, 43, 44, 45, 46 that allow the user specify the location of the content on their Web and WAP pages that are accessible by content viewers using web accessible devices and mobile telephones. Once the user has selected the location of the file in their content offering, the user clicks on the upload button 47 and the file is encoded into a plurality of streaming formats and simultaneously uploaded to the content server's accessible memory 27 and the links to the content are inserted in the desired, specified locations.

Figure 5:
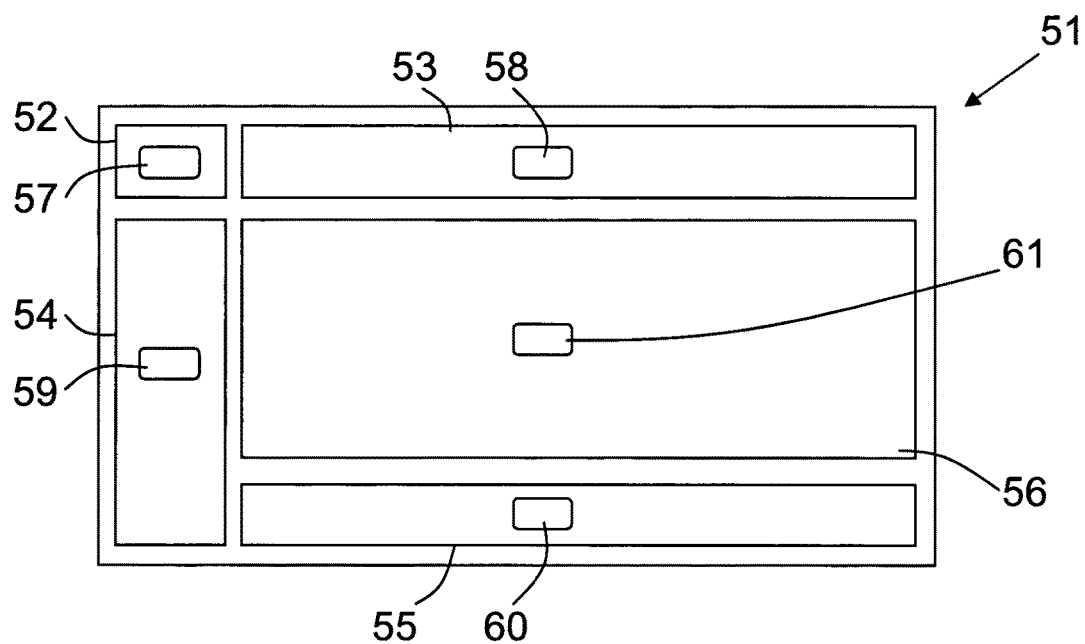
FIG. 5 is a block diagram of a web page illustrating the layout of the web page according to a first embodiment of the present invention.

Referring to FIG. 5, there is shown a block diagram of a web page 51, illustrating the format of the web page according to a first embodiment of the present invention. The web page 51 comprises a plurality of web page components, 52, 53, 54, 55 and 56. There are further provided a plurality of encoders, 57, 58, 59, 60 and 61. It will be noted that there is only one encoder in each of the components. In this way, the encoders do not have a tendency to conflict with each other. By clicking on the upload button as previously shown in FIG. 4, the content is accessed by each of the encoders as each of the encoders is called in turn through a call to their component. In the embodiment shown, only five encoders are used however it will be understood that several more or less encoders could be provided depending on the content provider's requirements. If a Windows-Based Encoder® is present as one of the encoders, 57, 58, 59, 60, 61, it is invoked before any of the other encoders to prevent conflict between the encoders. The functions are all hidden from the user as indeed are the pages. In the example of FIG. 5, there are effectively 5 pages embedded in one page. By pressing the Upload Button in FIG. 3, the encoding of the content is invoked.

Figure 6:
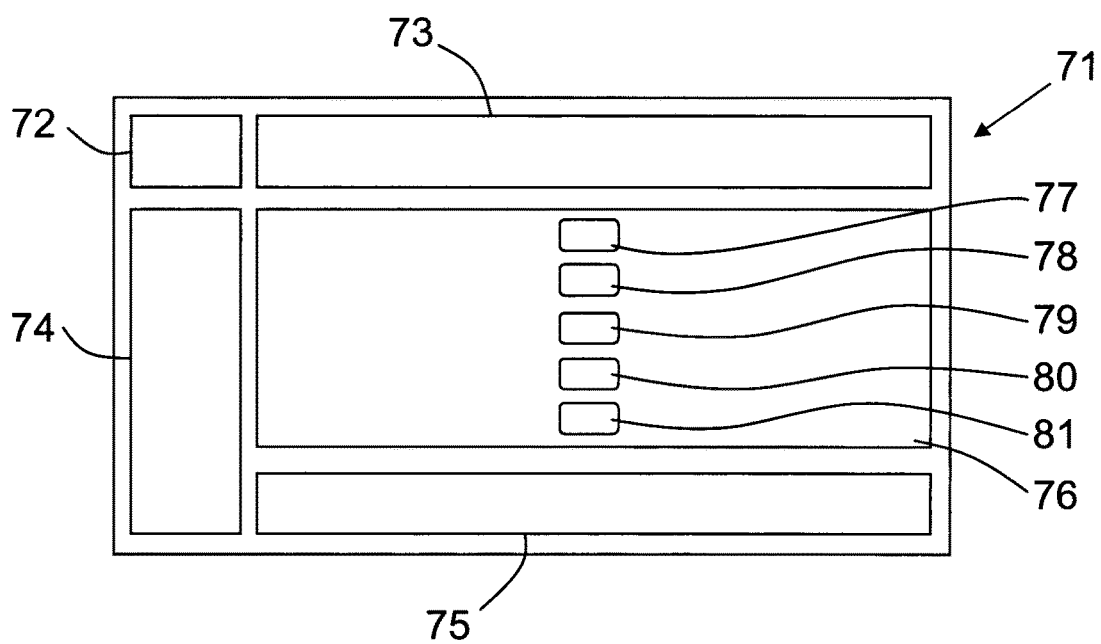
FIG. 6 is a block diagram of a web page illustrating the layout of the web page according to a second embodiment of the present invention.

Referring to FIG. 6, there is shown a block diagram of a web page illustrating the content of the web page according to a second embodiment of the present invention, indicated generally by the reference numeral 71. The web page 71 comprises a plurality of web page components, 72, 73, 74, 75 and 76. There are further provided a plurality of encoders, 77, 78, 79, 80 and 81. In this embodiment, there is provided a plurality of encoders in a single component 76. The plurality of encoders are programmed in a sequential manner into the web page component 76 so that they do not conflict with each other. If a Windows-Based encoder such as Windows Media Player is present as one of the encoders, 77, 78, 79, 80, 81, it is invoked before any of the other encoders to prevent conflict between the encoders. In the embodiment shown, only five encoders are used however it will be understood that several more or less encoders could be provided depending on the content provider's requirements.

It will be understood that the content providers will be able to specify the types of encoders that they wish to have in their web page during an initial web page construction phase. For example, the web page may have a template of components and encoders and the content provider can decide that they wish to support all available streaming formats in which case all of the encoders will be embedded in the web page. Alternatively, if they do not wish to support all formats they may pick and choose which encoder types that they wish to support and only have those encoders embedded in the web page. The unwanted components and/or the encoders can be removed with ease from the web page without having a detrimental effect on the remaining web page code.

Figure 7:
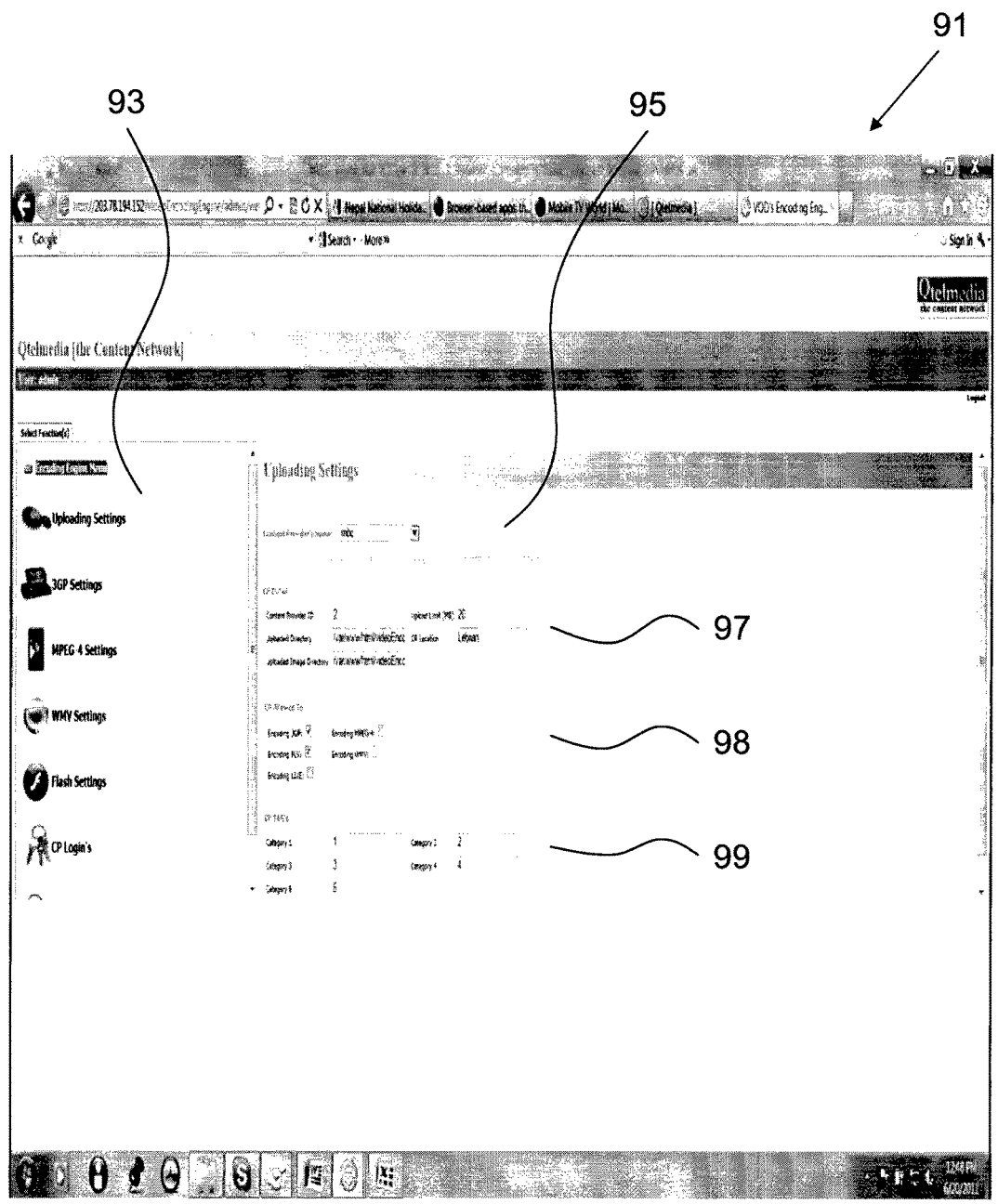
FIG. 7 is a screen shot of an administration web page used to implement the present invention.

Referring to FIG. 7, there is shown a screen shot 91 of an administration web page used to implement the present invention. The administration web page has a plurality of sections including an encoding engine menu 93 and an updating settings menu 95. The encoding engine menu 93 provides a list of the functionality and viewing formats that the content provider may use and update including general uploading settings, 3GP settings, MPEG-4 settings, WMV settings, Flash Settings and Content Provider (CP) login.

The content of the updating settings menu 95 is presented depending on the selection chosen by the user from the encoding engine menu 93. In the embodiment shown, the user has selected the uploading settings icon from the encoding engine menu 93 and a plurality of sections 97, 98, 99 are provided in the updating settings menu 95 that relate to the uploading settings profile of the content provider. The sections 97, 98, 99 include a CP detail section 97 which contains information about the content provider including their ID, the upload limit size, the content providers location, the content provider's uploaded directory address and the content providers uploaded image directory address. CP permissions section 98 includes the list of content formats with check-boxes to indicate which of the content formats the CP is currently able to provide to their customers. In the embodiment shown, the content provider is able to provide content in 3GP and FLV file formats. CP Tags section 99 contains a list of the various tags under which the content provider can display their content.

If one of the other icons is selected from the encoding engine menu, such as the 3GP settings menu, the various settings for 3GP uploads will be provided, such as, but not limited to, the content provider ID, the output extension, the audio sampling rate, the size, the audio bit rate, the frame rate for EDGE, the bit rate for 3G, the bit rate for GPRS, the video CODEC, the audio channel, the audio CODEC, the buffer size, the frame rate for 3G, the frame rate for GPRS and the bit rate for EDGE. In addition to these options, it is envisaged that there will be provided an "apply" button and a "cancel" button to accept or reject respectively any proposed changes to the settings made by the user during the session. Similar options will be provided for each of the other icons in the encoding engine menu 93.

It will be understood that the web page is hosted on the content server, although in principal, this could also be a standalone offering on a separate machine and only be used for encoding, security and dictating where the content will end up being stored or hosted depending on the content provider's wishes. Furthermore, it will be understood that in addition to trying to run multiple encoders from one page, there would also be inherent difficulties in running multiple applications at the same time if the user had downloaded and installed the encoder applications all on the local computer. There is also the fact of in some instances if a machine was setup in a certain way, whereas the user could potentially run multiple media applications simultaneously, they may have the additional issue of accessing the same file at the same time by these applications. Accordingly, the present invention overcomes such problems also.

In certain circumstances, a particular "work start" process may have to be put in place. There are certain scenarios where different encoding format processes must be started before other ones in order to avoid conflict. This is common particularly on windows based systems.

It will be appreciated that there are a number of additional elements and advantageous aspects to the present invention. First of all, the present invention comprises an administration tool that allows new content providers to be added in a seamless fashion. This includes providing a secure link, a selection of data sections to add to the content being uploaded, a selection of formats to be used depending on the receptive audience, the amount of content sections to be included and the like. Secondly, the administration tool will generate both the content provider page and an end viewer set of pages for different device types. This is achieved without significant user interaction and is a highly automated process.

It will be further understood that the method according to the present invention will be performed largely in software and therefore the present invention extends also to computer programs, on or in a carrier, comprising program instructions for causing a computer to carry out steps of the method, in particular the encoding and uploading steps. The computer program may be in source code format, object code format or a format intermediate source code and object code. The computer program may be stored on or in a carrier, in other words a computer program product, including any computer readable medium, including but not limited to a floppy disc, a CD, a DVD, a memory stick, a tape, a RAM, a ROM, a PROM, an EPROM or a hardware circuit. In certain circumstances, a transmissible carrier such as a carrier signal when transmitted either wirelessly and/or through wire and/or cable could carry the computer program in which cases the wire and/or cable constitute the carrier.

It will be further understood that the present invention may be performed on two, three or more machines with certain parts of the computer-implemented method being performed by one machine and other parts of the computer-implemented method being performed by another device. The devices may be part of a LAN, WLAN or could be connected together over a communications network including but not limited to the internet. Many of the method steps could be performed "in the cloud", meaning that remotely located processing power may be utilised to process certain method steps of the present invention. Accordingly, it will be understood that many of the method steps may be performed remotely, by which it is meant that the method steps could be performed either on a separate machine in the same locality or jurisdiction or indeed on a separate machine or machines in several remote jurisdictions. For example, the content provider computer could be in a first jurisdiction whereas the content server could be in a second jurisdiction. Similarly, the content server processor and web server may be in one jurisdiction and the content server accessible memory could be in a second jurisdiction. The present invention and claims are intended to also cover those instances where the method is performed across two or more machines located in one or more jurisdictions and those situations where the parts of the system are spread out over one or more jurisdictions.

In this specification the terms "comprise, comprises, comprised and comprising" and the terms "include, includes, included and including" are all deemed totally interchangeable and should be afforded the widest possible interpretation.

The invention is in no way limited to the embodiment hereinbefore described but may be varied in both construction and detail within the scope of the specification.

The invention claimed is:

1. A method of providing live television or video-on-demand content available for distribution to a plurality of content viewers' devices, the content viewers' devices having a plurality of disparate content viewing applications thereon, in a system comprising:
    a content provider computer operated by a content provider; and
    a content server accessible by the content provider computer over a data communications network and accessible by the content viewers' devices over one of the data communication network and a mobile telecommunications network, the content server having accessible memory, the method comprising the steps of:
    storing content on the content provider computer;
    the content provider computer accessing a web page hosted by the content server, the web page having a plurality of content encoders embedded therein;
    the content provider computer selecting the content for distribution and thereafter the content provider computer encoding the content into a plurality of streaming formats using the plurality of content encoders and the content provider computer uploading the content in the plurality of streaming formats to the content server;
    storing the content in the plurality of streaming formats on the content server's accessible memory; and
    updating at least one of a web page and a WAP page accessible by the content viewers' devices with a link to access the uploaded content.

2. The method as claimed in claim 1 comprising the preliminary step of providing a web page tailored specifically to the content provider with the plurality of encoders embedded therein pre-selected according to a content provider's specification.

3. The method as claimed in claim 2 in which the content server hosts a plurality of web pages each having a plurality of encoders embedded therein and the step of the content provider computer accessing a web page hosted by the content server further comprises the content provider computer accessing the web page tailored specifically for the content provider.

4. The method as claimed in claim 1 in which the web page comprises a plurality of web page components and the method comprises the initial step of embedding only one encoder in any given component.

5. The method as claimed in claim 1 in which the web page comprises a web page component and the method comprises the initial step of programming a plurality of encoders in a sequential manner into a single component so that the encoders are called in a predetermined sequence.

6. The method as claimed in claim 1 in which prior to encoding the content into a plurality of streaming formats, the method comprises the step of determining whether there is a Windows-Based encoder embedded in the web page and, if present, starting encoding with the Windows-Based encoder before encoding with the other encoders.

7. The method as claimed in claim 1 comprising the additional step of establishing a private secure network connection between the content provider computer and the content server.

8. The method as claimed in claim 7 comprising the step of uploading the encoded content in streaming format immediately as it is encoded.

9. A system for providing video-on-demand content to a plurality of content viewers' devices, the content viewers' devices having a plurality of disparate content viewing applications thereon, the system comprising:
    a content provider computer operated by a content provider, the content provider computer having a web browser;
    a content server accessible by the content provider computer over a data communications network and accessible by the content viewers' devices over one of the data communications network and a mobile telecommunications network;
    a web page hosted by the content server and accessible by the content provider computer, the web page having embedded therein a plurality of encoders for encoding content by the content provider computer into a plurality of streaming formats and uploading by the content provider computer the content in the plurality of streaming formats from the content provider computer to the content server;
    the content server having accessible memory for storage of the content in the plurality of streaming formats; and
    the content server hosting at least one of a web page and a WAP page accessible by the content viewers' devices with a link to access the uploaded content thereon.

10. The system as claimed in claim 9 in which the content server hosts a plurality of web pages each having a plurality of encoders embedded therein.

11. The system as claimed in claim 10 in which each web page is tailored specifically to one of the content providers with the plurality of encoders embedded therein pre-selected according to that content provider's specification.

12. The system as claimed in claim 9 in which the web page comprises a plurality of web page components, each component having only one encoder embedded therein.

13. The system as claimed in claim 9 in which the web page comprises a web page component and there is provided a plurality of encoders programmed in a sequential manner into the web page component.

14. The system as claimed in claim 9 comprising a private secure network connection between the content provider computer and the content server.

15. The system as claimed in claim 9 in which one of the content provider computer and the content server is located locally and the other of the content provider computer and the content server is located remotely.

16. A computer readable device having program instructions stored thereon for causing a computer to implement the method steps performed by the content server of claim 1.

17. A computer readable device having program instructions stored thereon for causing a computer to implement the method steps performed by the content provider computer of claim 1.

* * * * *